US010633261B1

(12) United States Patent
Bondurant

(10) Patent No.: US 10,633,261 B1
(45) Date of Patent: Apr. 28, 2020

(54) WATER FILTRATION SYSTEM AND METHOD OF USE

(71) Applicant: Nimon Bondurant, Fayetteville, GA (US)

(72) Inventor: Nimon Bondurant, Fayetteville, GA (US)

(*) Notice: Subject to any disclaimer, the term of this patent is extended or adjusted under 35 U.S.C. 154(b) by 61 days.

(21) Appl. No.: 15/226,640

(22) Filed: Aug. 2, 2016

(51) Int. Cl.
*C02F 1/18* (2006.01)
*C02F 1/44* (2006.01)
*C02F 1/00* (2006.01)
*B01D 35/26* (2006.01)
*B01D 29/52* (2006.01)
*B01D 61/14* (2006.01)
*B01D 29/56* (2006.01)

(52) U.S. Cl.
CPC .............. *C02F 1/002* (2013.01); *B01D 29/52* (2013.01); *B01D 29/56* (2013.01); *B01D 35/26* (2013.01); *B01D 61/142* (2013.01); *B01D 61/145* (2013.01); *C02F 1/444* (2013.01); *B01D 2311/2649* (2013.01); *B01D 2319/04* (2013.01)

(58) Field of Classification Search
CPC .... B01D 61/02; B01D 61/022; B01D 61/025; B01D 61/027; B01D 61/08; B01D 61/10; B01D 61/14; B01D 61/142; B01D 61/145; B01D 61/147; B01D 61/18; B01D 61/20; B01D 2313/54; B01D 2313/90; B01D 2311/04; B01D 2311/06; B01D 2311/25; B01D 2201/26; B01D 2201/265; B01D 2313/20; B01D 2313/243; B01D 2313/44; B01D 2313/48; B01D 2321/04; B01D 65/02; C02F 1/002; C02F 1/18; C02F 9/005; C02F 2201/008
See application file for complete search history.

(56) References Cited

U.S. PATENT DOCUMENTS

| | | | | |
|---|---|---|---|---|
| 5,122,265 A | * | 6/1992 | Mora | B01D 61/08 210/134 |
| 6,841,068 B1 | * | 1/2005 | Yoon | B01D 61/027 210/266 |
| 2011/0315615 A1 | * | 12/2011 | Lin | C02F 9/005 210/142 |
| 2013/0048549 A1 | * | 2/2013 | Burrows | B01D 61/04 210/232 |

(Continued)

*Primary Examiner* — Pranav N Patel
(74) *Attorney, Agent, or Firm* — Charlena Thorpe, Esq.; Incorporating Innovation LLC

(57) ABSTRACT

A portable water filtration system that is configured to provide potable water from a contaminated water source. The portable water filtration system includes a pre-treatment module and a polishing module that are fluidly coupled and contained within a stackable housing configuration. The pre-treatment module has disposed therein a pump, two solenoid valves, a first filter and a pair of ultra-filters wherein the aforementioned elements are all fluidly coupled utilizing plastic tubing. Water is cycled through the elements of the pre-treatment module and is then directed to the polishing module. Disposed within the polishing module are four filters that have filtration material therein operable to filter material within a range of 0.0002 to 0.0009 microns. The portable water filtration system is operable in a filtration mode and a flush mode.

6 Claims, 3 Drawing Sheets

(56) References Cited

U.S. PATENT DOCUMENTS

Figure 1:
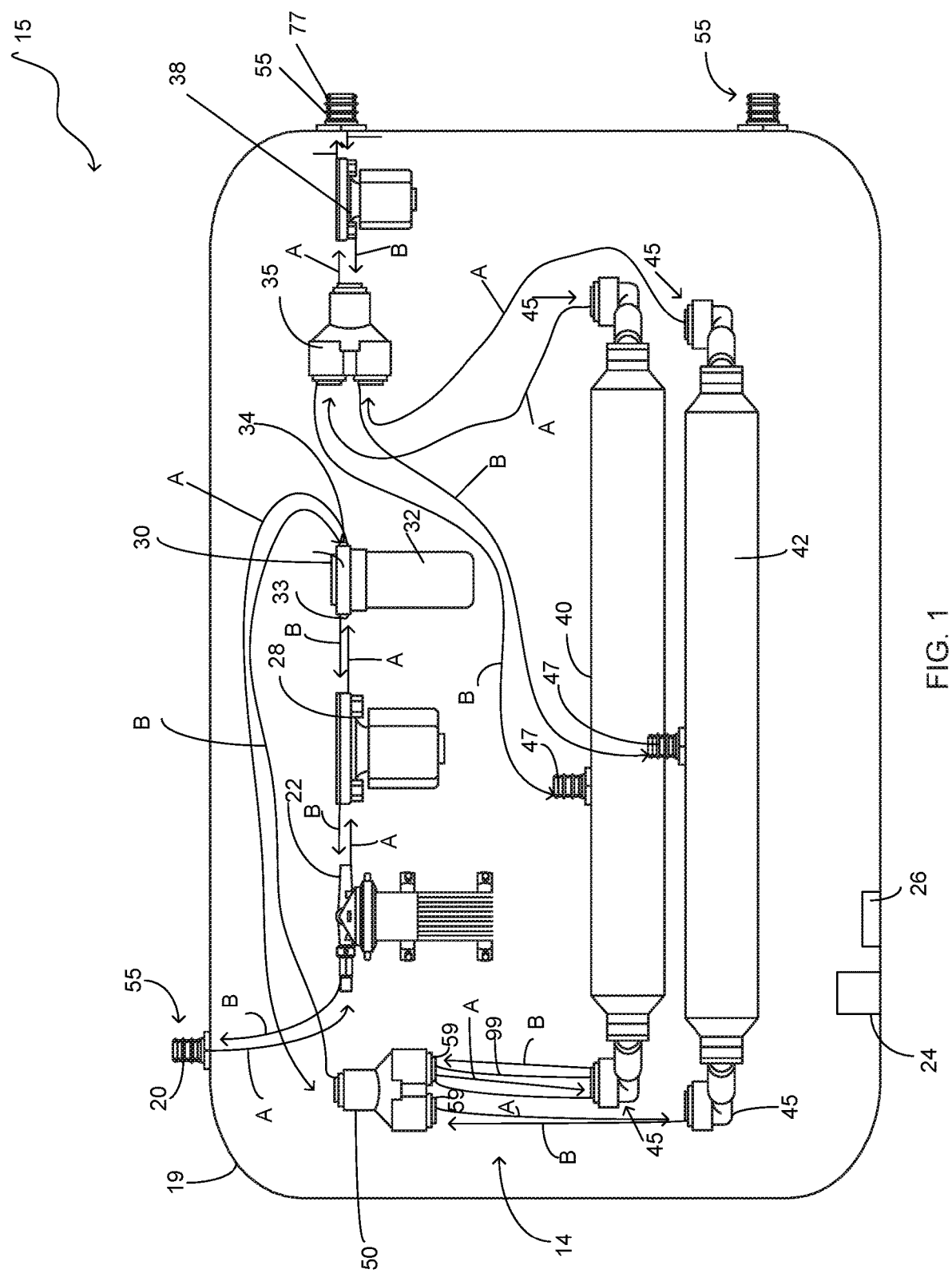

| | | | |
|---|---|---|---|
| 2013/0270159 A1* | 10/2013 | Lin | C02F 9/00 210/85 |
| 2014/0021115 A1* | 1/2014 | Ellegaard | C02F 9/005 210/182 |
| 2015/0376033 A1* | 12/2015 | Tao | B01D 61/58 210/639 |

* cited by examiner

WATER FILTRATION SYSTEM AND METHOD OF USE

FIELD OF THE INVENTION

The present invention relates generally to water filtration, more specifically but not by way of limitation a portable water filtration system that is configured to leverage a plurality of nanofiltration membranes to effectively remove organic, inorganic and biologic materials so as to render the water safe for consumption.

BACKGROUND

Much of the world struggles with access to clean drinking water. Clean water is one of the most basic necessities of human life but is unattainable for millions of people in the world. Countries are struggling with plans to provide long term supply of ground water as many natural resources are not only being depleted but are being contaminated as well. There are numerous environmental effects on ground water development. Various sources of significant disruption of the hydrologic cycle can reduce freshwater water availability for both surface water and groundwater. Water quality matters, not simply as a matter of retaining potable water in our reservoirs and sustainable habitats for aquatic life, but water quality is also a hidden threat to our deep aquifers that eventually replenish our lakes and streams. Water quality issues include not only inorganic and toxic chemical compounds but organic matter and overgrowth of nutrients.

Current technology to filter water so as to prepare for human consumption utilize techniques such as but not limited to ultrafiltration, activated charcoal and ultra-violet light. The latter being more difficult as it requires a power source and in remote areas/third-world countries this is not a viable option. The aforementioned techniques all have shown to have deficiencies when utilized to clean water that is more polluted. Charcoal filtration occurs as the water passes over the surface thereof and the pores of the charcoal progress towards saturation and ultimately have a reduced capacity to causing more contaminants to pass by leading to reduced water quality output of the filtration process. Users are unable to determine when the charcoal has reached or begins to reach saturation and as such take the risk of utilizing these systems. Additionally, utilization of ultraviolet has shown to be effective in the disruption of biological reproduction but can be ineffective in elimination of the biologics. Higher turbidity and faster flow rates also create a decrease in the effectiveness of ultraviolet light techniques.

Accordingly, there is a need for a water filtration apparatus that is portable and utilizes components and elements that are operable to effectively remove from all raw water types biological, inorganics, organics and other contaminants so as to produce potable water.

SUMMARY OF THE INVENTION

It is the object of the present invention to provide a water filtration system that is portable and is configured to effectively remove all organic, inorganic and biological contaminants from the water introduced thereinto.

Another object of the present invention is to provide a water filtration system configured to produce potable water a plurality of membrane cartridges to decontaminate the water introduced into the water filtration apparatus.

A further object of the present invention is to provide a water filtration system operable to remove contaminants from a water supply such as but not limited to biologics that is organized in modules.

An additional object of the present invention is to provide a water filtration system that is configured to produce potable water wherein one modules includes a pretreatment system that includes at least two membrane cartridges.

Yet a further object of the present invention is to provide a water filtration system that is configured to effectively remove contaminants from the water supplied thereto that further includes a module that is operable to polish the water moving therethrough.

Still another object of the present invention is to provide a water filtration system that is configured to produce potable water wherein the polishing module contains at least four membrane cartridges.

An alternative object of the present invention is to provide a water filtration system that is configured to effectively remove contaminants from the water supplied thereto wherein the membrane cartridges contain nanofiltration membranes.

Another object of the present invention is to provide a water filtration system that is configured to produce potable water wherein the nanofiltration membranes utilize 0.0002 micron holes to effectively remove all contaminants.

To the accomplishment of the above and related objects the present invention may be embodied in the form illustrated in the accompanying drawings. Attention is called to the fact that the drawings are illustrative only. Variations are contemplated as being a part of the present invention.

BRIEF DESCRIPTION OF THE ASSEMBLY

Figure 2:
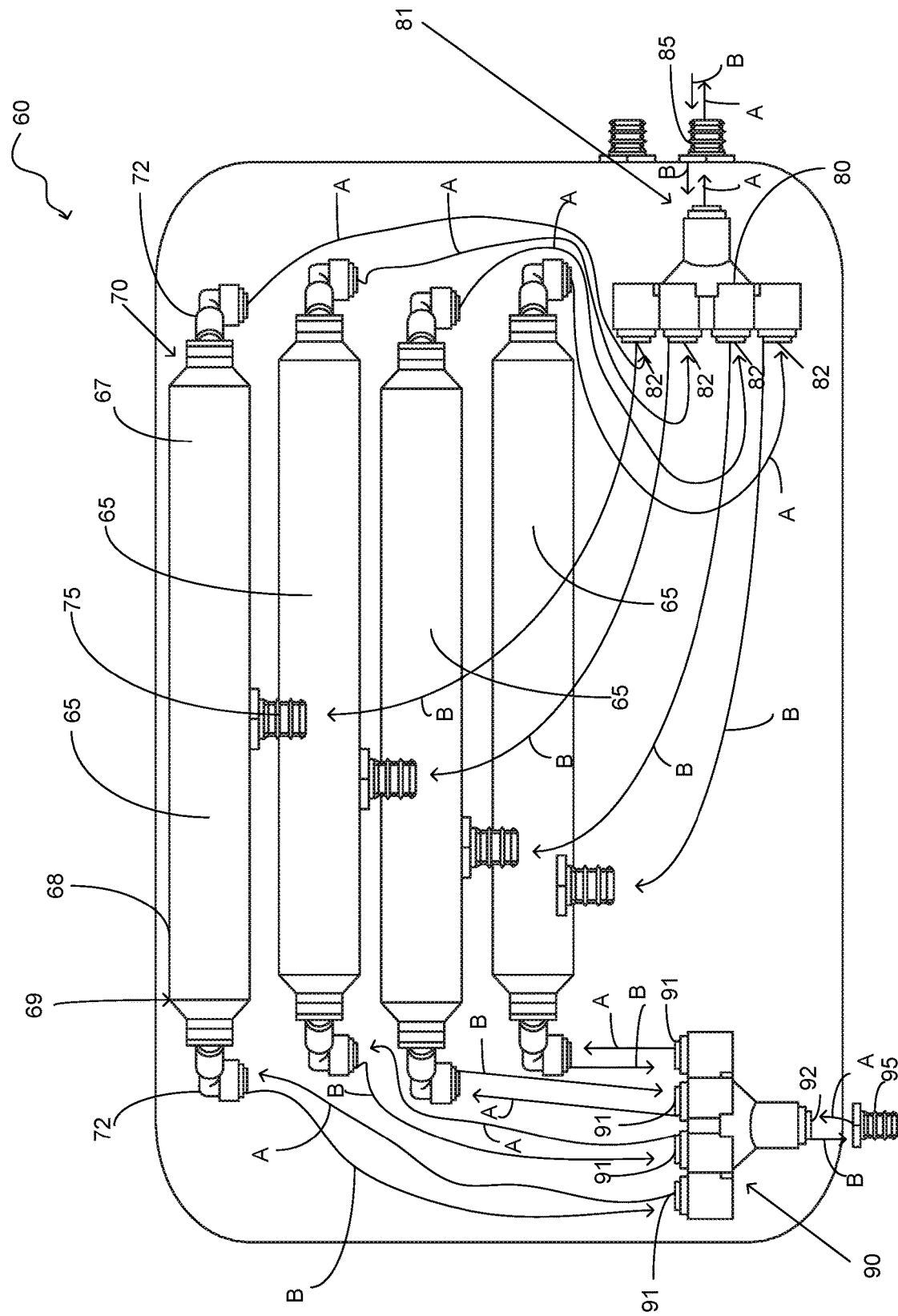
Figure 3:
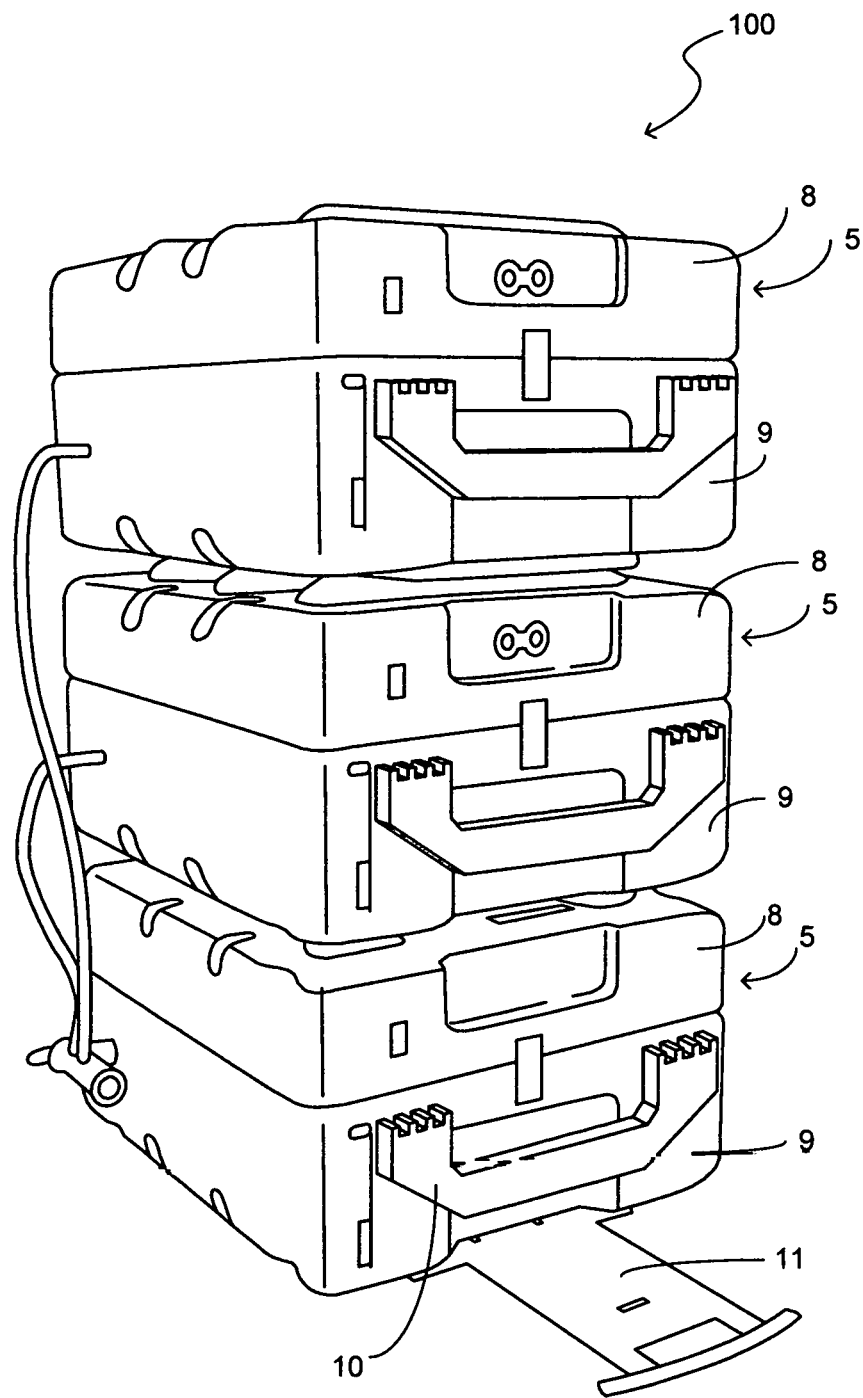

A more complete understanding of the present invention may be had by reference to the following Detailed Description when taken in conjunction with the accompanying Drawings wherein:

FIG. 1 is a diagrammatic view of the pre-treatment module of the present invention; and FIG. 2 is diagrammatic view of the polishing module of the present invention; and FIG. 3 is an external view of modules of the present invention.

DETAILED DESCRIPTION

Referring now to the drawings submitted herewith, wherein various elements depicted therein are not necessarily drawn to scale and wherein through the views and figures like elements are referenced with identical reference numerals, there is illustrated a water filtration system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

A description of the components of the water filtration apparatus 100 will ensue and be followed by a discussion of the flow path of water through the water filtration system 100 wherein the flow path includes a first path and second path. As shown in particular in FIG. 3 herein, the water filtration apparatus 100 includes modules 5 that include housing 7. Housing 7 is manufactured from a suitable durable material such as but not limited to plastic. The housing 7 include a first portion 8 and second portion 9 that are hingedly coupled utilizing conventional fasteners so as to allow access to the interior volume of the housing 7 and provide access to the components therein. The modules 5 further includes handles 10, 11 to facilitate the carrying and/or the transportation thereof. It is contemplated within the scope of the present invention that the modules 5 could be configured with various types of handles and further be equipped with conventional components such as but not limited to wheels in order to facilitate the transportation of the water filtration apparatus 100. The modules 5 of the water filtration apparatus 100 are secured to each other utilizing conventional mechanical fasteners such as but not limited to clips. It is contemplated within the scope of the present invention that the modules 5 could be releasably secured to each other utilizing various suitable durable techniques and/or fasteners.

Referring now in particular to FIG. 1, the pre-treatment module 15 is illustrated therein. The pre-treatment module 15 includes coupling 20 that is secured to the wall 19 and is configured to have a house releasably secured thereto. The coupling 20 is a manufactured from a suitable durable material such as but not limited to plastic and includes a passage therethrough so as to allow fluid to enter the pre-treatment module 15. Pump 22 is secured within the interior volume 14 of the pre-treatment module 15. The pump 22 is a conventional bi-directional fluid pump that is configured to pump fluid in a desired direction depending upon whether a user is flushing the pre-treatment module 15 or utilizing the pre-treatment module 15 to filter water in preparation for consumption. The pump 22 is operably coupled to power source 24 and switch 26 so as to control the operation thereof. It is contemplated within the scope of the present invention that the power source 24 could be either an AC interface or be an on-board DC power source such as a battery. The switch 26 is a conventional electronic switch that provides an electronic interface intermediate the power source 24 and the solenoid valves and pump 22 connected thereto.

Secured adjacent to the pump 22 is a first solenoid valve 28. The first solenoid valve 28 is a conventional solenoid valve that is configured to control the direction of fluid within the pre-treatment module 15. The first solenoid valve 28 is operably coupled to the power source 24 and switch 26 so as to control the operation thereof. Adjacent to the first solenoid valve 28 is first filter 30. First filter 30 includes top portion 31 and bottom portion 32 wherein the bottom portion 32 is releasably secured to the top portion 31. Bottom portion 32 is constructed of a removable filter cartridge housed in a exterior shell such as but not limited to plastic. Fluid flows into and out of the first filter via ports 33,34. The first filter 30 is constructed utilizing a filter material having a filtration pore size of a range from one to ten microns. A union 35 is secured within the pre-treatment module 15 adjacent to first filter 30. While one filter 30 is illustrated in the drawings submitted herewith, it is contemplated within the scope of the present invention that more than one filter 30 could be present. Additionally, while the drawings submitted herewith illustrate the filter 30 downstream of the pump 22 it is contemplated within the scope of the present invention that the filter 30 could be fluidly intermediate the pump 22 and coupling 20. Union 35 is manufactured from a suitable durable material and is operable to couple a plurality of hoses so as to fluidly couple the elements disposed within the pre-treatment module. It should be recognized that the water filtration apparatus 100 contains a plurality of conventional hoses that are operable to fluidly couple the elements thereof. The flow path of fluid through the water filtration system 100 is discussed later herein and directional arrows have been utilized to provide understanding of the fluid flow through the water filtration system 100. Only one exemplary hose 99 has been illustrated herein and it should be understood by those of ordinary skill in the art that wherein a directional arrow is illustrated and discussed that the transport of fluid occurs utilizing a flexible plastic hose suitable for transport of potable water.

Adjacent to union 35 is second solenoid valve 38. Second solenoid valve 38 is a conventional solenoid valve configure to control the direction of fluid within the pre-treatment module 15 depending upon whether the water filtration system 100 is in its flush mode or filter mode. The second solenoid valve 38 is operably coupled to the power source 24 and switch 26 so as to control the operation thereof. While a second solenoid valve 38 is illustrated and discussed herein, it is contemplated within the scope of the present invention that an alternative embodiment of the present invention not include the second solenoid valve 38 wherein union 35 is fluidly coupled to fitting 77. Secured within the interior volume 14 of the pre-treatment module 15 are a first ultra-filter cartridge 40 and a second ultra-filter cartridge 42. The first ultra-filter cartridge 40 and second ultra-filter cartridge 42 are fluidly coupled to union 35. The first ultra-filter cartridge 40 and second ultra-filter cartridge 42 include fitting 45 that are configured to have releasably secured thereto hose/tubing suitable for transport of water as previously discussed herein. The first ultra-filter cartridge 40 and second ultra-filter cartridge 42 further include couplings 47 that are secured to the The first ultra-filter cartridge 40 and second ultra-filter cartridge 42 intermediate fittings 45. Couplings 47 are sealably secured to the first ultra-filter cartridge 40 and second ultra-filter cartridge 42 and are utilized during the flush mode as further discussed herein. The first ultra-filter cartridge 40 and second ultra-filter cartridge 42 contain therein filtration material that is manufactured to have a pore size having the range of 0.01 microns to 0.001 microns. Second union 50 is further provided and is manufactured similarly to union 35 of plastic or other durable material. Second union 50 is fluidly coupled to first filter 30 and the first ultra-filter cartridge 40 and second ultra-filter cartridge 42 as will be further discussed herein. It should be noted that the pre-treatment module 15 includes a plurality of fittings 55 that are secured thereto wherein the fittings 55 are operable to have releasably secured thereto hose/tubing to facilitate the flow of fluid when the water filtration system is being utilized in either a flush mode or filter mode.

Illustrated herein in FIG. 2 is the polishing module 60 of the water filtration system 100. Disposed within the interior volume 62 of the polishing module 60 are a plurality of nanofilters 65. Each nanofilter 65 is constructed identically and as such the ensuing description of nanofilter 67 applies to all nanofilters 65. Nanofilter 67 includes cylindrical body 68 manufactured from a durable material such as but not limited to plastic. The body 68 includes a first end 69 and second end 70. Secured to first end 69 and second end 70 are fittings 72 that are configured to have secured thereto plastic hosing/tubing as previously discussed herein. Secured to the body 68 intermediate the first end 69 and second end 70 is coupling 75. Coupling 75 is sealably secured to body 68 utilizing suitable techniques and is operably coupled to union 80. Union 80 is manifold style union configured to receive a stream of flow into port 81 and divide the flow into four and discharge from ports 82. Union 80 is fluidly coupled to port 85. A second union 90 is present distal to union 80 within the polishing module 60. The second union 90 is also a manifold style union wherein the second union 90 receives a flow of fluid into ports 91 and discharges through ports 92. Fluid exiting port 92 is directed to port 95 as port 92 and port 95 are fluidly coupled utilizing hose/tubing.

The nanofilters 65 are configured to provide additional filtration of fluid subsequent the fluid passing through the pre-treatment module 15. The nanofilters 65 have disposed therein filter cartridge material that has a pore size of 0.0002 microns to 0.0009 microns. The aforementioned pore size is required to ensure all contaminants that may be present in the fluid being circulated through the water filtration system 100 are removed. While four nanofilters 65 have been illustrated herein, it is contemplated within the scope of the present invention that the polishing module 60 may have more or less than four nanofilters 65.

Ensuing is a discussion of the flow path of fluid wherein the water filtration system 100 is being utilized in its filtration mode. The water flow direction for the filtration mode in the pre-treatment module 15. has been labeled herein with directional arrows all labeled A. Direction arrows A indicate the directional flow of the water in the pre-treatment module 15. A hose/tubing is secured to coupling 20 wherein an end opposite the end connected to the coupling 20 is immersed in a source of water that a user desires to filter in order to ensure that the water is potable. Ensuing the pre-treatment module 15 being fluidly coupled to a water source the pump 22 is activated which begins to draw source water into the pre-treatment module 15. Water flows from the pump 22 to solenoid valve 28, which is in position to promote water flow in the direction of the first filter 30, which is fluidly coupled to the solenoid valve 28. The water entering the first filter 30 is filtered as previously described herein and exits therefrom being directed to the second union 50 wherein the flow of water is divided exiting ports 59. Second union 50 is fluidly coupled to the first ultra-filter cartridge 40 and a second ultra-filter cartridge 42. Water passes through the first ultra-filter cartridge 40 and a second ultra-filter cartridge 42 being filtered while traversing therethrough and upon exiting therefrom is directed to union 35 to which the first ultra-filter cartridge 40 and a second ultra-filter cartridge 42 are fluidly coupled. Union 35 converges the flow of water wherein the flow of water continues to the second solenoid valve 38 that is in position so as to facilitate the water flow out to fitting 77 wherein the water is directed to the polishing module 60.

Still discussing the filtration mode of the water filtration system 100 as the pre-treatment module 15 and polishing module 60 are fluidly coupled through hose/tubing, water exiting fitting 77 enters port 95. Port 95 is fluidly coupled to second union 90, which diverges the flow of water to the plurality of nanofilters 65. As the water flows through the plurality of nanofilters 65 the water is cleaned of any remaining contaminants. Water exits the plurality of nanofilters 65 and is directed to the first union 80 wherein the water stream converges and exits port 81 and subsequently port 85 wherein water exiting port 85 is potable and is captured utilizing a suitable container. A previously stated herein, the flow of water as indicated herein by directional arrows A are accomplished utilizing conventional hose/tubing wherein an exemplary hose 99 has been illustrated herein.

The water filtration system 100 further includes a flush mode as previously mentioned herein. The flush mode is operable to flush the water filtration system 100 of captured contaminants periodically as desired by a user. The flow path of water during the flush mode is illustrated herein with directional arrows labeled B. As previously stated, the components of the pre-treatment module 15 and polishing module 60 are operably coupled utilizing hose/tubing. The water filtration system 100 is flushed utilizing a suitable cleaning fluid and/or water. In the flush mode the pump 22, solenoid valve 28 and second solenoid valve 38 are positioned so as to facilitate the flow of cleaning fluid as indicated by the directional arrows B. Cleaning fluid for the flush mode of the water filtration system is introduced into port 85 and subsequently flows to first union 80 wherein the fluid is diverged into four separate streams so as to be directed into the four nanofilters 65. Fluid traverses through the nanofilters 65 exiting therefrom and being directed to second union 85 wherein the flow of fluid is converged and directed outward from the polishing module 60 via port 95. Port 95 and fitting 77 are fluidly coupled utilizing hose/tubing as discussed herein. As fluid exits port 95, the fluid enters fitting 77 and subsequently the second solenoid valve 38. As previously mentioned herein, the second solenoid valve 38 is in the required position to allow the discussed flow path for the flush mode. Fluid exits from second solenoid valve 38 flowing into union 35 wherein the flow is diverged so as to be directed to both the first ultra-filter cartridge 40 and a second ultra-filter cartridge 42. The cleaning fluid will traverse through the first ultra-filter cartridge 40 and a second ultra-filter cartridge 42 an upon exiting therefrom will be directed to second union 50. From second union 50 the cleaning fluid flow path (as indicated by directional arrow B) is directed to the first filter 30 then the solenoid valve 28 and ensuingly the pump 22 and further discharged through coupling 20. As previously mentioned herein the pump 22 is a bi-directional pump so as to facilitate the directional flow of fluid for both the filtration mode and the flush mode of the water filtration system 100.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A portable water filtration system configured to create portable water from a contaminated water source, the portable water system comprising:
    a pre-treatment module, said pre-treatment module comprising a housing having an interior volume, wherein a pump, a first filter, a first solenoid valve, and two ultra-filters are disposed within said interior volume of said pre-treatment module, said housing configured to provide access to said interior volume, said pre-treatment module having an inlet and an outlet, said inlet configured to receive water from said contaminated water source, wherein:
    the pump being operably coupled to the said inlet, said pump configured to control flow of water through the portable filtration system, said pump configured to control the flow of water in a first direction and a second direction;
    the portable filtration system is operable in a filtration mode and a flush mode and wherein in said filtration mode and said flush mode, the pump is configured to direct flow path of the water in the first direction and in said flush mode, the pump is configured to direct flow path of water in the second direction;
    said first filter having a first port and a second port, said first filter being fluidly coupled to said pump, said first filter having a removable filtration cartridge, said first filter configured to receive water from said pump via the first solenoid valve at the first port in the filtration mode and configured to receive water at the second port from said two ultra-filters in the flush mode;
    the first solenoid valve being intermediate the fluid path between said pump and said first filter, and further being fluidly coupled therewith, wherein the first solenoid valve is configured to receive water from the pump in the filtration mode and configured to receive water from the first filter in the flush mode;
    each of the two ultra-filters having a first port, a second port, and a third port, said two ultra-filters being fluidly coupled to said first filter, wherein each of the two ultra-filters are configured to receive water from the first filter via the first port of the ultra-filter to the outlet of said pre-treatment module in the filtration mode and to receive water from the outlet to the third port of the ultra-filter in the flush mode and to output the water via the first port of the ultra-filter to the first filter in the flush mode;
    said outlet of the pre-treatment module being fluidly coupled to said two ultra-filters, said outlet configured to direct water outward from said pre-treatment module in the filtration mode and to received water from a polishing module in the flush mode;
    said polishing module having a housing, said housing of the polishing module being independent of said housing of said pre-treatment module, said polishing module designed to be transported individually from said pre-treatment module, said polishing module having an interior volume with a plurality of filters disposed within the interior volume of the polishing module, said polishing module being fluidly coupled to said outlet of said pre-treatment module utilizing a hose, said polishing module having an inlet configured to receive fluid from said pre-treatment module in the filtration mode and to output water to the pre-treatment module in the flush mode, and having a polishing module outlet wherein:
    said plurality of filters being disposed within said interior volume of said polishing module, each of the plurality of filters having a first port, a second port, and a third port, each of said plurality of filters being cylindrical in shape, each of said plurality of filters being fluidly coupled to said inlet of the polishing module, said plurality of filters configured to provide further filtration of water passing therethrough wherein in said filtration mode and said flush mode the pump is operable to direct flow path of the water in alternate direction through each of the ultra-filters and each of the plurality of filters, wherein each of the plurality of filters are configured to receive water from the inlet of the polishing module via the first port of the filter of the polishing module in the filtration mode and output the water via the second port of the filter of the polishing module to the polishing module outlet in the filtration mode and to receive water from the polishing module outlet to the third port of the filter of the polishing module in the flush mode and to output the water via the first port of the filter to the inlet of the polishing module in the flush mode; and
    the polishing module outlet configured to receive water exiting said plurality of filters, said polishing module outlet operable to direct water to a container for capture thereof.

2. The portable water filtration system as recited in claim 1, wherein each of the plurality of filters disposed in said polishing module have filtration material configured to filter material within a range of 0.0002 to 0.0009 microns.

3. The portable water filtration system as recited in claim 2, wherein said two ultra-filters include filtration material configured to filter material within a range of 0.01 to 0.001 microns.

4. The portable water filtration system as recited in claim 3, wherein said first filter include filtration material configured to filter material between 1 to 10 microns.

5. The portable water filtration system as recited in claim 4, wherein the polishing module further includes a first union and a second union, said first union and said second union operably coupled to said plurality of filters.

6. The portable water filtration system as recited in claim 5, wherein said pre-treatment module further includes a power supply disposed therein.

* * * * *